(12) United States Patent
Haeger et al.

(10) Patent No.: US 6,391,982 B1
(45) Date of Patent: May 21, 2002

(54) HIGHLY BRANCHED POLYAMIDE GRAFT COPOLYMERS

(75) Inventors: Harald Haeger, Marl; Ralf Richter, Recklinghausen; Georg Oenbrink, Duelmen, all of (DE)

(73) Assignee: Degussa AG, Duesseldorf (DE)

( * ) Notice: Subject to any disclaimer, the term of this patent is extended or adjusted under 35 U.S.C. 154(b) by 26 days.

(21) Appl. No.: 09/605,874

(22) Filed: Jun. 29, 2000

(30) Foreign Application Priority Data

Jun. 29, 1999 (DE) .......................................... 199 29 886
Feb. 9, 2000 (DE) .......................................... 100 05 640

(51) Int. Cl.[7] .............................................. C08G 73/04
(52) U.S. Cl. ................. 525/417; 525/326.7; 525/328.2; 525/374; 525/375; 525/540; 424/DIG. 16; 528/324; 528/329.1; 528/335; 528/350
(58) Field of Search ............................ 525/326.7, 328.2, 525/374, 375, 540, 417; 528/324, 329.1, 335, 350; 424/DIG. 16

(56) References Cited

U.S. PATENT DOCUMENTS 3,442,975 A * 5/1969 Cawthon et al.
5,859,148 A 1/1999 Borggreve et al. .......... 525/420

FOREIGN PATENT DOCUMENTS

| EP | 0 377 259 | 11/1990 |
| EP | 0 672 703 | 9/1995 |
| WO | WO 97/46747 | 12/1997 |
| WO | WO 99/64496 | 12/1999 |

* cited by examiner

Primary Examiner—Ana Woodward
(74) Attorney, Agent, or Firm—Oblon, Spivak, McClelland, Maier & Neustadt, P.C.

(57) ABSTRACT

A graft copolymer is prepared by a process comprising:
graft polymerizing a polyamide-forming monomer selected from the group consisting of lactams and ω-aminocarboxylic acids and an oligocarboxylic acid selected from the group consisting of from 0.015 to about 3 mol. % of dicarboxylic acid and from 0.01 to about 1.2 mol. % of tricarboxylic acid, in each case the stated amounts of oligocarboxylic acid based on a molar amount of lactam, ω-aminocarboxylic acid or combination thereof, onto from 0.5 to 25% by weight, based on the graft copolymer, of a polyamine having at least 11 nitrogen atoms and a number-average molecular weight $M_n$ of at least 500 g/mol., wherein the amino group concentration in the graft copolymer ranges from 100 to 2500 mmol./kg.

17 Claims, No Drawings

HIGHLY BRANCHED POLYAMIDE GRAFT COPOLYMERS

BACKGROUND OF THE INVENTION

1. Field of the Invention

The present invention relates to highly branched polyamide graft copolymers which are composed of a polyamine moiety and grafted-on polyamide chains.

2. Background of the Invention

Graft copolymers based on polyamine and polyamide are known. They may be prepared, for example, by cationic polymerization of caprolactam in the presence of polyethyleneimine hydrochloride dendrimers as core molecules (J. M. Warakomski, Chem. Mater. 1992, 4, 1000–1004). Compared with linear nylon-6, nylon-6 dendrimers of this type have markedly reduced melt viscosity and solution viscosity, but unchanged tensile strength, stiffness, melting points, enthalpies of fusion and barrier action with respect to oxygen.

A description of graft copolymers based on polyvinylamine and polyamide is provided in U.S. Pat. No. 2,615,863. U.S. Pat. No. 3,442,975 describes graft copolymers which are prepared by polymerizing lactams in the presence of high-molecular-weight polyethyleneimine.

DE 19 15 772 describes polymer blends prepared from a polyiminepolyamide graft copolymer, and also from a polyolefin and/or polyester, which are processed to give fibers which can readily be colored.

Finally, DE 196 54 179 describes H-shaped polyamides which are prepared from lactams or aminocarboxylic acids, from an at least trifunctional amine, from dibasic carboxylic acids and from monobasic carboxylic acid. The reference discloses a certain ratio between the two last-mentioned compounds and between these two compounds and the functional groups of the at least trifunctional amine. The products have improved melt stability.

However, in many applications where the use of such polyamide graft copolymers is desirable, it has become apparent that these graft copolymers have insufficient solvent resistance and fuel resistance. Properties which are in many cases unsatisfactory are hydrolysis resistance, alcoholysis resistance, environmental stress cracking resistance and swelling behavior, and also dimensional stability. Further, the barrier action with respect to diffusion is unsatisfactory. A need continues to exist for polyamine-polyamide graft copolymers which exhibit better solvent resistance and fuel resistance.

SUMMARY OF THE INVENTION

Accordingly, one object of the present invention is to provide a polyamine-polyamide graft copolymer which exhibits better solvent resistance and fuel resistance.

Briefly, this object and other objects of the present invention as hereinafter will become more readily apparent can be attained by a graft copolymer prepared by a process comprising:

graft polymerizing polyamide-forming monomers selected from the group consisting of lactams and ω-aminocarboxylic acids and an oligocarboxylic acid selected from the group consisting of from 0.015 to about 3 mol. % of dicarboxylic acid and from 0.01 to about 1.2 mol. % of tricarboxylic acid, in each case the stated amounts of dicarboxylic acid and tricarboxylic acid being based on a molar amount of lactam, ω-aminocarboxylic acid or combination thereof, onto from 0.5 to 25% by weight, based on the graft copolymer, of a polyamine having at least 11 nitrogen atoms and a number-average molecular weight $M_n$ of at least 500 g/mol., wherein the amino group concentration in the graft copolymer ranges from 100 to 2500 mmol./kg.

DETAILED DESCRIPTION OF THE PREFERRED EMBODIMENTS

In the present invention the polyamine component of the graft copolymer is employed in the grafting reaction in an amount of from 0.5 to 25% by weight, preferably from 1 to 20% by weight and particularly preferably from 1.5 to 16% by weight, based on the graft copolymer. The polyamine has at least 11 nitrogen atoms and a number-average molecular weight $M_n$ of at least 500 g/mol., preferably at least 800 g/mol.

The amount of oligocarboxylic acid reactant is 0.015 to about 3 mol. % of dicarboxylic acid or from 0.01 to about 1.2 mol. % of tricarboxylic acid, in each case based on per mol. amount of lactam and/or ω-aminocarboxylic acid.

The amino group concentration in the graft copolymer is from 100 to 2500 mmol./kg.

The upper limits stated above for the dicarboxylic acid and tricarboxylic acid reactants are merely intended to ensure that the graft copolymer produced is thermoplastic and not crosslinked. According to current understanding these upper limits are good guide values. However, in individual cases, especially when using relatively high amounts of polyamine, even higher amounts of oligocarboxylic acid may be added. Graft copolymers of this type are also within the scope of the invention.

Examples of classes of the polyamine component employed in the present process for the preparation of graft copolymer are as follows:

polyvinylamines (Römpp Chemie Lexikon [Römpp's Chemical Encyclopedia], 9th edition, Vol. 6, p. 4921, Georg Thieme Verlag Stuttgart 1992);

polyamines prepared from alternating polyketones (DEA 196 54 058);

dendrimers, such as:
  $((H_2N—(CH_2)_3)_2N—(CH_2)_3)_2)—N(CH_2)_2—N$
  $((CH_2)_2—N((CH_2)_3—NH_2)_2)_2$ as described in DE 196 54 179, or
  3,15-bis(2-aminoethyl)-6,12-bis[2-[bis(2-aminoethyl) amino]ethyl]-9-[2-[bis[2-bis(2-aminoethyl)amino]-ethyl]amino]ethyl]-3,6,9,12,15-pentaazaheptadecane-1,17-diamine as described by J. M. Warakomski in Chem. Mat. 1992, 4, 1000–1004;

linear polyethyleneimines which can be prepared by polymerizing 4,5-dihydro-1,3-oxazoles, followed by hydrolysis as described in Houben-Weyl, Methoden der Organischen Chemie [Methods of Organic Chemistry] Vol. E20, pp. 1482–1487, Georg Thieme Verlag Stuttgart, 1987;

branched polyethyleneimines which are prepared by polymerizing aziridines as described in Houben-Weyl, Methoden der Organischen Chemie [Methods of Organic Chemistry], Vol. E20, pp. 1482–1487, Georg Thieme Verlag Stuttgart, 1987 and generally have the following amino group distribution:
  from 25 to 46% of primary amino groups,
  from 30 to 45% of secondary amino groups, and
  from 16 to 40% of tertiary amino groups.

The polyamine preferably has a number-average molecular weight $M_n$ of not more than 20,000 g/mol., particularly preferably not more than 10,000 g/mol. and in particular not more than 5000 g/mol.

Lactams and ω-aminocarboxylic acid which are used as polyamide-forming monomers contain from 4 to 19 carbon atoms, in particular from 6 to 12 carbon atoms. Particularly preferred lactams and ω-aminocarboxylic acids are ε-caprolactam, ε-aminocaproic acid, capryllactam, ω-aminocaprylic acid, laurolactam, ω-aminododecanoic acid and/or ω-aminoundecanoic acid.

The oligocarboxylic acid may be any desired di- or tricarboxylic acid having from 6 to 24 carbon atoms such as adipic acid, suberic acid, azelaic acid, sebacic acid, dodecanedioic acid, isophthalic acid, 2,6-naphthalenedicarboxylic acid, cyclohexane-1,4-dicarboxylic acid, trimesic acid and/or trimellitic acid.

If a dicarboxylic acid is employed, it is preferably used in an amount of from 0.03 to 2.2 mol. %, particularly preferably from 0.05 to 1.5 mol. %, very particularly preferably from 0.1 to 1 mol. % and in particular from 0.15 to 0.65 mol. % based on a molar amount of lactam or ω-aminocarboxylic acid used. If a tricarboxylic acid is employed, the amount is preferably from 0.02 to 0.9 mol. %, particularly preferably from 0.025 to 0.6 mol. %, very particularly preferably from 0.03 to 0.4 mol. % and in particular from 0.04 to 0.25 mol. %, based on a molar amount of lactam or ω-aminocarboxylic acid used. Tricarboxylic acid is used especially when molding compositions with increased melt stiffness are to be prepared for extrusion purposes.

If desired, an aliphatic, alicyclic, aromatic, aralkyl and/or alkylaryl-substituted monocarboxylic acid having from 3 to 50 carbon atoms, e.g. lauric acid, unsaturated fatty acids, acrylic acid or benzoic acid, may be employed as a regulator in the reaction. These regulators can reduce the concentration of amino groups without altering the form of the molecule. This method can also be used to introduce functional groups, such as double bonds and/or triple bonds, into the product. However, care needs to be taken to ensure that the graft copolymer has a substantial number of amino groups. The amino group concentration in the graft copolymer preferably ranges from 150 to 1500 mmol./kg, particularly preferably from 250 to 1300 mmol./kg and very particularly preferably from 300 to 1100 mmol./kg. For the purposes of the present invention, amino groups here and below are not only amino end groups, but also any secondary or tertiary amine function which may be present in the polyamine.

The graft copolymer of the present may be prepared by various processes.

In one method, a charge of a lactam or an ω-aminocarboxylic acid and a polyamine are polymerized or subjected to polycondensation. The oligocarboxylic acid component may be added to the charge either at the beginning or during the course of the reaction.

Another process has two stages in which, first cleavage and prepolymerization of the lactam is conducted in the presence of water, or the corresponding ω-aminocarboxylic acid is used directly and prepolymerized. In the second step, the polyamine is added, while the oligocarboxylic acid is metered in prior to, during or after the prepolymerization. The pressure is then reduced at a temperature ranging from 200 to 290° C. and the polycondensation occurs in a stream of nitrogen or in vacuo.

Another possible process consists in hydrolytically degrading a polyamide derived from one or more lactams or ω-aminocarboxylic acids, to give a prepolymer and then simultaneously or subsequently reacting this material with the polyamine.

The polyamides employed preferably are those in which the terminal group difference is approximately zero or in which the oligocarboxylic acid has previously been incorporated by polycondensation. However, the oligocarboxylic acid may also be added at the beginning of, or during the course of, the degradation reaction.

These processes can be used to prepare extremely highly branched polyamides with acid numbers below 40 mmol./kg, preferably below 20 mmol./kg and in particular below 10 mmol./kg. Virtually complete conversion is achieved after a reaction time as short as from one to five hours at temperatures of from 200 to 290° C.

If desired, a vacuum phase lasting a number of hours may follow as a further process step. The vacuum treatment is continued for at least four hours, preferably at least six hours and particularly preferably at least eight hours, at a temperature from 200 to 290° C. After an induction period of a number of hours, an increase in melt viscosity is then observed, which probably is attributable to a reaction of amino end groups with one another, with elimination of ammonia and chain-linking. The resulting increase in molecular weight thus achieved is particularly advantageous for molding compositions which are used for extrusion purposes.

If it is desirable not to complete the reaction in the melt, the highly branched polyamide can also be post-condensed in the solid phase as in the prior art.

The present graft copolymers may be used for molding compositions intended for injection molding or for extrusion processes. They may also be used as a blend component for modifying performance characteristics, or as a hot-melt adhesive.

Having now generally described this invention, a further understanding can be obtained by reference to certain specific Examples which are provided herein for purposes of illustration only and are not intended to be limiting unless otherwise specified.

The results shown in the Examples below were determined with the aid of the following test methods.

In order to determine the carboxyl end group content of a graft copolymer, 1 g of graft copolymer was dissolved in 50 ml of benzyl alcohol under nitrogen at 165° C. The time of dissolution was not more than 20 min. The solution was titrated with a solution of KOH in ethylene glycol (0.05 mol. KOH/l) with phenolphthalein indicator until the color changed.

In order to determine amino group content of a graft copolymer, 1 g of the graft copolymer was dissolved in 50 ml of m-cresol at 25° C. The solution was titrated potentiometrically with perchloric acid.

Solution viscosity $\eta_{rel}$ (relative viscosity) was determined using a 0.5% strength by weight solution in m-cresol at 25° C. as in DIN 53727/ISO 307.

EXAMPLES

Comparative Example 1
(Without Oligocarboxylic Acid)

A 4.75 kg amount of laurolactam was melted in a heating vessel at a temperature from 180 to 210° C. and transferred into a pressure-tight polycondensation vessel. A 250 ml amount of water and 57 ppm of hypophosphorous acid was then added. The cleavage of laurolactam was conducted at 280° C. under autogenic pressure. Pressure was then reduced within a period of 3 h to a residual water vapor pressure of 3 bar, and 250 g of polyethyleneimine (Lupasol G 100, poly-ethyleneimine from BASF AG, Ludwigshafen, Germany) were added. The pressure was then reduced to atmospheric pressure and polycondensation conducted at 250° C. for 2 h under a stream of nitrogen. The clear melt was charged via a melt pump into the form of an extrudate, cooled in a water bath and then pelletized.

$\eta_{rel}$: 1.58
Melting point $T_m$: 170° C.
Amino group concentration: 879 mmol./kg
Carboxyl end group concentration: <10 mmol./kg Example 1
(With 0.27 mol. % of Dodecanedioic Acid, Based on Laurolactam)

The procedure followed was the procedure described in Comparative Example 1 with one difference; that is, 15 g of dodecanedioic acid was added together with the polyethyleneimine.

$\eta_{rel}$: 1.52
Melting point Tm: 170° C.
Amino group concentration: 837 mmol./kg
Carboxyl end group concentration: <10 mmol./kg Example 2
(With 0.15 mol. % of Trimesic Acid, Based on Laurolactam)

The procedure followed was the procedure described in Comparative Example 1 with one difference; that is, 7.5 g of trimesic acid was added together with the polyethyleneimine.

$\eta_{rel}$: 1.56
Melting point $T_m$ 173° C.
Amino group concentration: 790 mmol./kg;
Carboxyl end group concentration: <10 mmol./kg Table 1 compares the solvent resistance of the products prepared. The data were obtained by storing pellets for 5 and, respectively, 10 days at 80° C. in a liquid mixture prepared from 42.5% by volume of toluene, 42.5% by volume of isooctane and 15% by volume of methanol and then drying the pellets. The relative viscosity $\eta_{rel}$ was then determined using a 0.5% strength by weight solution in m-cresol at 25° C. as described in DIN 53727/ISO 307. No alcoholytic degradation of the products obtained according to the invention could be detected.

TABLE 1

| | Solvent resistance | | |
|---|---|---|---|
| Storage time [days] | Comparative Example 1 $\eta_{rel}$ | Example 1 $\eta_{rel}$ | Example 2 $\eta_{rel}$ |
| 0 | 1.58 | 1.52 | 1.56 |
| 5 | 1.42 | 1.52 | 1.56 |
| 10 | 1.38 | 1.52 | 1.56 |

Example 3
(With 1.2 mol. % of Dodecanedioic Acid, Based on Laurolactam)

A 47.75 kg amount of laurolactam and 0.675 kg of dodecanedioic acid were melted in a heating vessel at a temperature from 180 to 210° C. and were transferred into a pressure-tight polycondensation vessel. A 2.5 kg amount of water and 57 ppm of hypophosphorous acid was then added. The cleavage of laurolactam was conducted at 280° C. under autogenic pressure. Pressure was then reduced within a period of 3 h to a residual water vapor pressure of 5 bar, and 2.25 kg of polyethyleneimine (Lupasol G 100, BASF AG, Ludwigshafen, Germany) were added. The pressure was then reduced to atmospheric pressure and polycondensation was conducted at 280° C. for 2 h under a stream of nitrogen. The clear melt was discharged, via a melt pump, in the form of an extrudate, cooled in a water bath and then pelletized.

$\eta_{rel}$: 1.60
Melting point $T_m$: 172° C.
Amino group concentration: 720 mmol./kg
Carboxyl end group concentration: 16 mmol./kg.

The disclosure of German priority Application No. 199 29 886.6 filed Jun. 29, 1999 and Application No. 10005640.7 filed Feb. 9, 2000 are hereby incorporated by reference into the present application.

Obviously, numerous modifications and variations of the present invention are possible in light of the above teachings. It is, therefore, to be understood that within the scope of the appended claims, the invention may be practiced otherwise than as specifically described herein

What is claimed as new and is intended to be Secured by Letters Patent is:

1. A graft copolymer prepared by a process comprising: graft polymerizing a polyamide-forming monomer selected from the group consisting of lactams, ω-aminocarboxylic acids and combination thereof, and an oligocarboxylic acid selected from the group consisting of from 0.015 to about 3 mol. % of dicarboxylic acid and from 0.01 to about 1.2 mol. % of tricarboxylic acid, in each case the stated amounts of oligocarboxylic acid based on a molar amount of lactam, ω-aminocarboxylic acid or combination thereof, onto from 0.5 to 25% by weight, based on the graft copolymer, of a polyamine having at least 11 nitrogen atoms and a number-average molecular weight $M_n$ of at least 500 g/mol., wherein the amino group concentration in the graft copolymer ranges from 100 to 2500 mmol./kg.

2. The graft copolymer as claimed in claim 1, wherein the oligocarboxylic acid is selected from the group consisting of 0.03 to 2.2 mol. % of dicarboxylic acid and 0.02 to 0.9 mol. % of tricarboxylic acid, based on a molar amount of said lactam, ω-aminocarboxylic acid or combination thereof.

3. The graft copolymer as claimed in claim 2, wherein the oligocarboxylic acid is selected from the group consisting of 0.05 to 1.5 mol. % of dicarboxylic acid and 0.025 to 0.6 mol. % of tricarboxylic acid.

4. The graft copolymer as claimed in claim 3, wherein the oligocarboxylic acid is selected from the group consisting of 0.1 to 1.0 mol. % of dicarboxylic acid and 0.03 to 0.4 mol. % of tricarboxylic acid.

5. The graft copolymer as claimed in claim 4, wherein the oligocarboxylic acid is selected from the group consisting of 0.15 to 0.65 mol. % of dicarboxylic acid and 0.04 to 0.25 mol. % of tricarboxylic acid.

6. The graft copolymer as claimed in claim 1, wherein the amino group concentration in the graft copolymer ranges from 150 to 1500 mmol./kg.

7. The graft copolymer as claimed in claim 6, wherein the amino group concentration in the graft copolymer ranges from 250 to 1300 mmol./kg.

8. The graft copolymer as claimed in claim 7, wherein the amino group concentration in the graft copolymer ranges from 300 to 1100 mmol./kg.

9. The graft copolymer as claimed in claim 1, wherein the polyamine is a branched polyethylenimine having the following amino group distribution:
25 to 46% primary amino groups
30 to 45% secondary amino groups
16 to 40% tertiary amino groups.

10. The graft copolymer as claimed in claim 1, wherein the acid number of the graft copolymer is less than 40 mmol./kg.

11. The graft copolymer as claimed in claim 1, wherein the polyamine has a number-average molecular weight $M_n$ of at least 800 g/mol.

12. The graft copolymer as claimed in claim 1, wherein the polyamine has a number-average molecular weight $M_n$ of not more than 20,000 g/mol.

13. The graft copolymer as claimed in claim 12, wherein the polyamine has a number-average molecular weight $M_n$ of not more than 10,000 g/mol.

14. The graft copolymer as claimed in claim 1, wherein the lactam or ω-aminocarboxylic acid is ε-caprolactam, ε-aminocaproic acid, capryllactam, ω-aminocaprylic acid, laurolactam, ω-aminododecanoic acid or ω-aminoundecanoic acid.

15. The graft copolymer as claimed in claim 1, wherein the oligocarboxylic acid is adipic acid, subaric acid, azelaic acid, sebacic acid, dodecanedioic acid, isophthalic acid, 2,6-naphthalenedicarboxylic acid, cyclohexane-1,4-dicarboxylic acid, trimesic acid or trimellitic acid.

16. The graft copolymer as claimed in claim 1, wherein the grafting reaction is conducted in the presence of a regulator which is an aliphatic, alicyclic, aromatic, aralkyl and/or alkylaryl-substituted monocarboxylic acid having from 3 to 50 carbon atoms.

17. The graft copolymer as claimed in claim 16, wherein the regulator is a member selected from the group consisting of lauric acid, unsaturated fatty acids, acrylic acid or benzoic acid.

* * * * *